(12) United States Patent
Tsujimoto et al.

(10) Patent No.: US 8,215,101 B2
(45) Date of Patent: Jul. 10, 2012

(54) EXHAUST PURIFICATION DEVICE OF AN INTERNAL COMBUSTION ENGINE

(75) Inventors: Kenichi Tsujimoto, Susono (JP); Mikio Inoue, Susono (JP); Shinya Hirota, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 371 days.

(21) Appl. No.: 12/226,520

(22) PCT Filed: Mar. 19, 2008

(86) PCT No.: PCT/JP2008/055795
§ 371 (c)(1),
(2), (4) Date: Oct. 21, 2008

(87) PCT Pub. No.: WO2008/123325
PCT Pub. Date: Oct. 16, 2008

(65) Prior Publication Data
US 2009/0084091 A1    Apr. 2, 2009

(30) Foreign Application Priority Data

Mar. 19, 2007  (JP) ................. 2007-071083
Apr. 19, 2007  (JP) ................. 2007-110159
Mar. 14, 2008  (JP) ................. 2008-066179

(51) Int. Cl.
*F01N 3/28* (2006.01)
(52) U.S. Cl. ............... 60/286; 60/295; 60/301
(58) Field of Classification Search .......... 60/286, 60/295, 301, 303
See application file for complete search history.

(56) References Cited

U.S. PATENT DOCUMENTS

| 5,155,994 | A | * | 10/1992 | Muraki et al. ........... 60/275 |
| 6,374,595 | B1 | * | 4/2002 | Penetrante et al. ....... 60/275 |
| 6,375,910 | B1 | | 4/2002 | Deeba et al. |
| 7,313,911 | B2 | | 1/2008 | Pfeifer et al. |
| 2002/0029564 | A1 | | 3/2002 | Roth et al. |
| 2003/0014966 | A1 | * | 1/2003 | Hirota et al. ........... 60/284 |
| 2004/0050037 | A1 | | 3/2004 | Betta et al. |
| 2005/0060987 | A1 | * | 3/2005 | Nakano et al. .......... 60/285 |
| 2006/0107655 | A1 | * | 5/2006 | Hanitzsch et al. ....... 60/286 |
| 2006/0168948 | A1 | | 8/2006 | Xu et al. |

(Continued)

FOREIGN PATENT DOCUMENTS
CN        1454702 A    11/2003
(Continued)

OTHER PUBLICATIONS

Jan. 24, 2011 Search Report Issued in EP 08738962.

*Primary Examiner* — Thomas E Denion
*Assistant Examiner* — Jonathan Matthias
(74) *Attorney, Agent, or Firm* — Oliff & Berridge, PLC

(57) ABSTRACT

In an internal combustion engine, an $NO_X$ purification catalyst (14) is arranged in the engine exhaust passage and an intermediate product producing catalyst (12) able to store $NO_X$ contained in the exhaust gas is arranged at the upstream of the $NO_X$ purification catalyst (14). The intermediate product producing catalyst (12) is fed with mist fuel, and intermediate products (33) comprising bonded molecules comprised of an $NO_X$ and hydrocarbon molecules more than an equivalent ratio with respect to an $NO_X$ molecule are produced from the $NO_X$ trapped in the intermediate product producing catalyst (12) or the $NO_X$ contained in the exhaust gas and the fed fuel.

9 Claims, 4 Drawing Sheets

U.S. PATENT DOCUMENTS

| | | | |
|---|---|---|---|
| 2006/0196165 A1* | 9/2006 | Otsubo et al. | 60/274 |
| 2007/0101704 A1* | 5/2007 | Goulette et al. | 60/295 |
| 2009/0229249 A1* | 9/2009 | Bremm et al. | 60/276 |

FOREIGN PATENT DOCUMENTS

| | | |
|---|---|---|
| EP | 1519015 A2 | 3/2005 |
| EP | 1698766 A1 | 9/2006 |
| JP | 08-014027 | 1/1996 |
| JP | A-2000-257417 | 9/2000 |
| JP | A-2001-283374 | 10/2001 |
| JP | A-2003-201888 | 7/2003 |
| JP | A-2003-524107 | 8/2003 |
| JP | A-2004-108176 | 4/2004 |
| JP | A-2006-506581 | 2/2006 |
| JP | A-2006-507926 | 3/2006 |
| JP | 2006207531 A * | 8/2006 |
| JP | A-2006-519331 | 8/2006 |
| JP | 2006-233894 | 9/2006 |
| WO | WO 2005103460 A1 * | 11/2005 |
| WO | WO 2006/069652 A1 | 7/2006 |
| WO | WO 2006069652 A1 * | 7/2006 |

* cited by examiner (A)

(B)

(A)

(B)

EXHAUST PURIFICATION DEVICE OF AN INTERNAL COMBUSTION ENGINE

TECHNICAL FIELD

The present invention relates to an exhaust purification device of an internal combustion engine.

BACKGROUND ART

Known in the art is an internal combustion engine arranging in the engine exhaust passage an $NO_X$ storage catalyst which stores $NO_X$ contained in the exhaust gas when the air fuel ratio of the inflowing exhaust gas is lean and releases the stored $NO_X$ when the air fuel ratio of the inflowing exhaust gas is a stoichiometric air fuel ratio or rich and arranging a compact three-way catalyst in the engine exhaust passage upstream of this $NO_X$ storage catalyst (see for example Japanese Patent Publication (A) No. 2004-108176). In this internal combustion engine, if the $NO_X$ storage ability of the $NO_X$ storage catalyst approaches saturation, the air fuel ratio of the exhaust gas is temporarily made rich whereby $NO_X$ is released from the $NO_X$ storage catalyst and reduced.

However, there is a problem in that, in this internal combustion engine, when making the $NO_X$ storage catalyst release $NO_X$ by feeding mist fuel upstream of the $NO_X$ storage catalyst, the $NO_X$ released from the $NO_X$ storage catalyst cannot be properly reduced.

DISCLOSURE OF THE INVENTION

An object of the present invention is to provide an exhaust purification device of an internal combustion engine able to reduce $NO_X$ released from the $NO_X$ storage catalyst well when causing the $NO_X$ storage catalyst to release $NO_X$ by feeding mist fuel upstream of the $NO_X$ storage catalyst.

According to the present invention, there is provided an exhaust purification device of an internal combustion engine an $NO_X$ purification catalyst is arranged in an engine exhaust passage, an intermediate product producing catalyst able to store $NO_X$ contained in an exhaust gas is arranged in the engine exhaust passage upstream of the $NO_X$ purification catalyst, a fuel feed valve is arranged in the engine exhaust passage upstream of the intermediate product producing catalyst to feed a mist fuel from the fuel feed valve to the intermediate product producing catalyst, intermediate products each comprising bonded molecules of an $NO_X$ and hydrocarbon molecules more than an equivalent ratio to an $NO_X$ molecule are produced from the $NO_X$ trapped in the intermediate product producing catalyst or the $NO_X$ contained in the exhaust gas and the fed fuel, and the intermediate products produced in the intermediate product producing catalyst are sent into the $NO_X$ purification catalyst and purified in the $NO_X$ purification catalyst.

In the present invention, by producing an extremely reactive intermediate product comprising bonded molecules of an oxidizing agent and a reducing agent in this way, HC and $NO_X$ are made to be easily purified in the $NO_X$ purification catalyst.

BEST MODE FOR CARRYING OUT THE INVENTION

Figure 1:
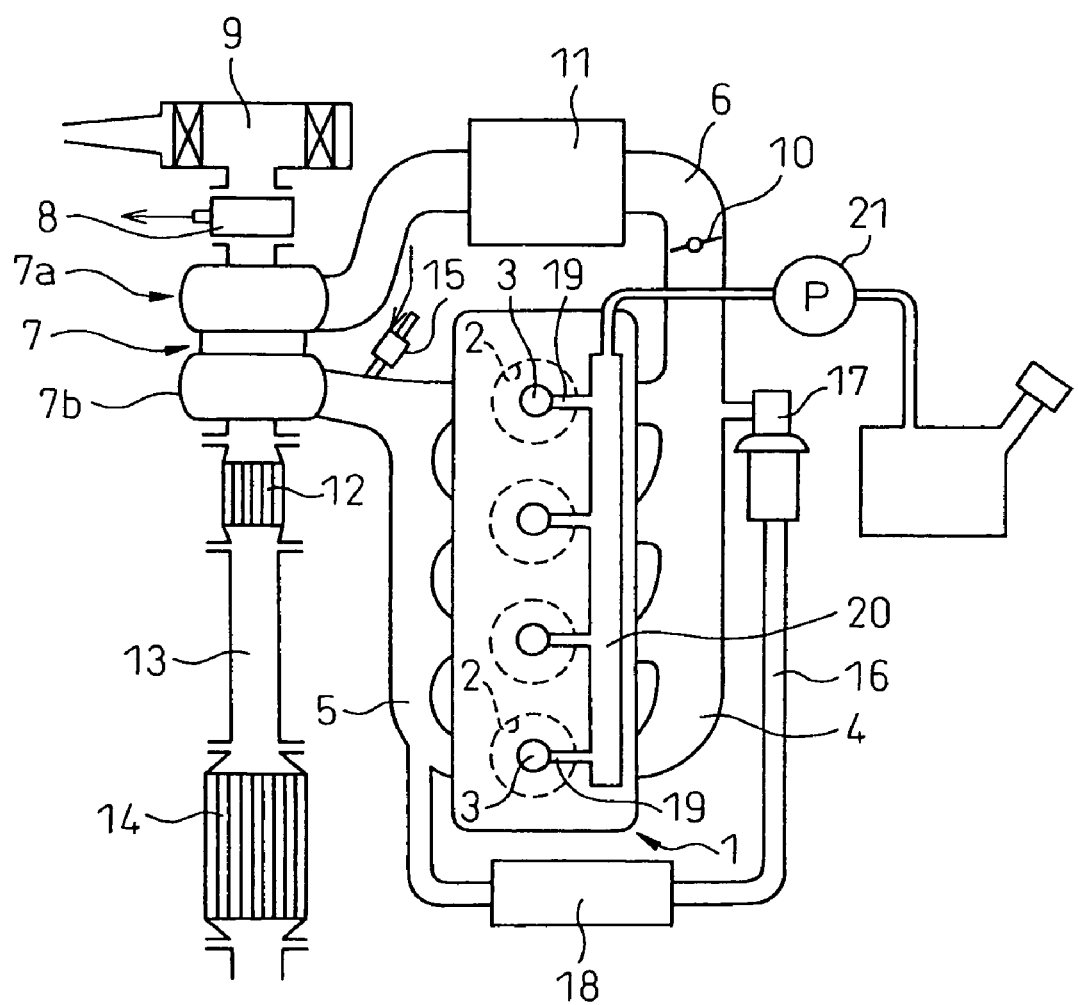
FIG. 1 is an overview of a compression ignition type internal combustion engine.

FIG. 1 shows an overview of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7, while the inlet of the compressor 7a is connected through an intake air detector 8 detecting an amount of intake air to an air cleaner 9. Inside the intake duct 6, a throttle valve 10 driven by a step motor is arranged. Further, around the intake duct 6, a cooling device 11 for cooling the intake air flowing through the inside of the intake duct 6 is arranged. In the embodiment shown in FIG. 1, the engine cooling water is led into the cooling device 11 where the engine cooling water is used to cool the intake air.

On the other hand, the exhaust manifold 5 is connected to the inlet of an exhaust turbine 7b of the exhaust turbocharger 7. The outlet of the exhaust turbine 7b is connected to the inlet of an intermediate product producing catalyst 12 able to store $NO_X$ contained in the exhaust gas. The outlet of the intermediary catalyst 12 is connected through an exhaust pipe 13 to the exhaust purification catalyst 14. Further, inside the exhaust manifold 5, a fuel feed valve 15 for feeding fuel into the exhaust gas flowing through the inside of the exhaust manifold 5 is attached.

The exhaust manifold 5 and intake manifold 4 are connected to each other through an exhaust gas recirculation (hereinafter referred to as "EGR") passage 16. Inside the EGR passage 16, an electronic control type EGR control valve 17 is arranged. Further, around the EGR passage 16, a cooling device 18 for cooling the EGR gas flowing through the EGR passage 16 is arranged. In the embodiment shown in FIG. 1, engine cooling water is led to the cooling device 18 where the engine cooling water cools the EGR gas. On the other hand, each fuel injector 3 is connected through a fuel feed tube 19 to a common rail 20. This common rail 20 is fed with fuel from an electronically controlled variable discharge fuel pump 21. The fuel fed into the common rail 20 is fed through each fuel tube 19 into each fuel injector 3.

In the present invention, the intermediate product producing catalyst 12 is comprised of a catalyst having the function of trapping $NO_X$ contained in the exhaust gas. This intermediate product producing catalyst 12 carries a catalyst carrier comprising for example alumina. The $NO_X$ contained in the exhaust gas is trapped on the catalyst carrier surface. In this embodiment of the present invention, as this intermediate product producing catalyst 12, an $NO_X$ storage catalyst able to trap the $NO_X$ in the exhaust gas is used. Further, as the $NO_X$ purification catalyst 14, an $NO_X$ storage catalyst is also used. Therefore, first, an $NO_X$ storage catalyst will be described.

Figure 2:
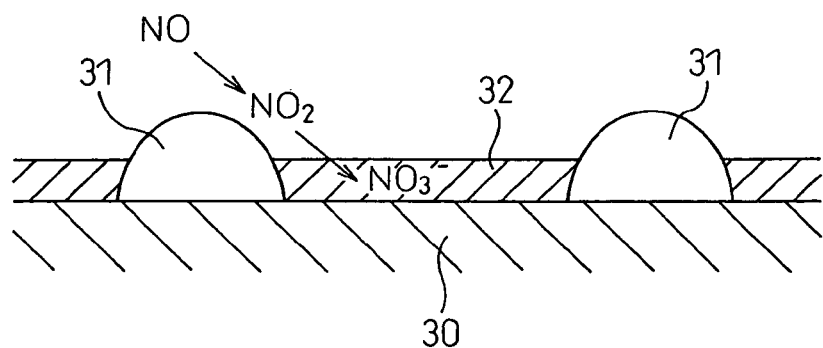
FIG. 2 is across-sectional view of the surface part of a catalyst carrier of an $NO_X$ storage catalyst.
Figure 2:
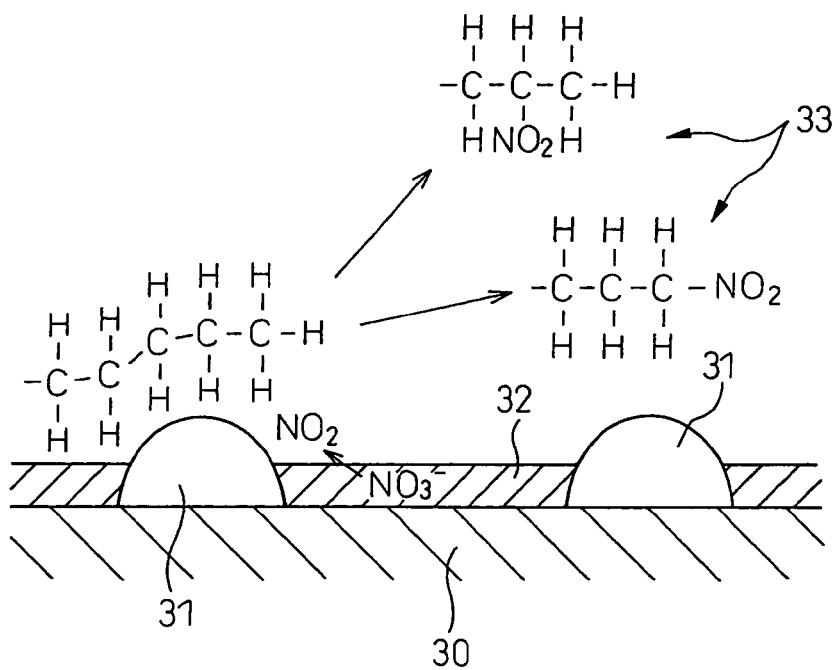

An $NO_X$ storage catalyst is for example comprised of a substrate on which a catalyst carrier comprised of alumina is carried. FIGS. 2(A) and (B) illustrate cross-sections of the surface part of this catalyst carrier 30. As shown in FIGS. 2(A) and (B), the catalyst carrier 30 carries a precious metal catalyst 31 diffused on its surface. Further, the catalyst carrier 30 is formed with a layer of an $NO_X$ absorbent 32 on its surface.

In the embodiment according to the present invention, as the precious metal catalyst 31, platinum Pt is used. As the ingredient forming the $NO_X$ absorbent 32, for example, at least one element selected from potassium K, sodium Na, cesium Cs, and other such alkali metals, barium Ba, calcium Ca, and other such alkali earths, lanthanum La, yttrium Y, and other rare earths is used.

If the ratio of the air and fuel (hydrocarbons) fed into the engine intake passage, combustion chambers 2, and exhaust passage upstream of the $NO_X$ storage catalyst is called the "air-fuel ratio of the exhaust gas", an $NO_X$ absorption and release action such that the $NO_X$ absorbent 32 absorbs the $NO_X$ when the air-fuel ratio of the exhaust gas is lean and releases the absorbed $NO_X$ when the oxygen concentration in the exhaust gas falls is performed.

That is, explaining this taking as an example the case of using barium Ba as the ingredient forming the $NO_X$ absorbent 32, when the air-fuel ratio of the exhaust gas is lean, that is, the oxygen concentration in the exhaust gas is high, the NO contained in the exhaust gas, as shown in FIG. 2(A), is oxidized on the platinum Pt 31 to become $NO_2$, next is absorbed in the $NO_X$ absorbent 32 and bonds with the barium carbonate $BaCO_3$ while diffusing in the form of nitrate ions $NO_3^-$ into the $NO_X$ absorbent 32. In this way, $NO_X$ is absorbed in the $NO_X$ absorbent 32. So long as the oxygen concentration in the exhaust gas is high, $NO_2$ is formed on the platinum Pt 31. So long as the $NO_X$ absorbent 32 is not saturated in $NO_X$ absorption ability, $NO_2$ is absorbed in the $NO_X$ absorbent 32 and nitrate ions $NO_3^-$ are formed.

As opposed to this, if the air-fuel ratio of the exhaust gas is made rich or a stoichiometric air-fuel ratio, the oxygen concentration in the exhaust gas falls, so the reaction proceeds in the reverse direction ($NO_3^- \rightarrow NO_2$ or NO), therefore the nitrate ions $NO_3^-$ in the $NO_X$ absorbent 32 are released in the form of $NO_2$ or NO from the $NO_X$ absorbent 32. Next, the released $NO_X$ is reduced by the unburned HC and CO contained in the exhaust gas.

In this way, when the air-fuel ratio of the exhaust gas is lean, that is, when burning the fuel under a lean air-fuel ratio, the $NO_X$ in the exhaust gas is trapped and absorbed in the $NO_X$ absorbent 32. However, when the fuel continues to be burned under a lean air-fuel ratio, the $NO_X$ absorbent 32 eventually ends up becoming saturated in $NO_X$ absorption ability, therefore the $NO_X$ absorbent 32 ends up becoming unable to absorb the $NO_X$. Therefore, in this embodiment of the present invention, before the $NO_X$ absorbent 32 becomes saturated in absorption ability, fuel is fed from the fuel feed valve 15 to produce intermediate products in the intermediate product producing catalyst 12 comprising the $NO_X$ storage catalyst. The production of this intermediate product enables the $NO_X$ to be reliably purified. This will be described next.

In this embodiment of the present invention, a light fuel or a heavy fuel having a light fuel as a main ingredient is fed in a mist state, that is, in the form of particulates, from the fuel feed valve 15. Part of the fed fuel is oxidized, but the majority, as shown in FIG. 2(B), adheres to the surface of platinum Pt 31 and the surface of the $NO_X$ absorbent 32. If the fed fuel adheres to the surface of the platinum Pt 31, the oxygen concentration on the surface of the platinum Pt 31 will fall, causing the $NO_3^-$ of the $NO_X$ absorbent 32, as shown in FIG. 2(B), to be released in the form of $NO_2$ or NO.

If the $NO_2$ is released, as the hydrocarbons HC adhered to the platinum Pt 31 are waiting there, the released $NO_2$ reacts immediately with the hydrocarbons HC, whereby, as shown in FIG. 2(B), an intermediate product 33 comprising the hydrocarbons HC and $NO_2$, that is, the bonded molecules of the hydrocarbons HC and $NO_X$, is produced. Note that the number of carbon atoms of the hydrocarbons HC in the fed fuel is considerably large. Accordingly, in the intermediate product producing catalyst 12, intermediate products each comprising bonded molecules of a $NO_X$ and hydrocarbon molecule more than an equivalent ratio with respect to an $NO_X$ molecule are produced from the stored $NO_X$ and the fed fuel.

The intermediate products produced in the intermediate product producing catalyst 12 is sent into the $NO_X$ purification catalyst 14. This intermediate product is comprised of bonded molecules of the reducing agent, i.e, hydrocarbons HC and the oxidizing agent, i.e, $NO_X$ and is therefore extremely easily reactive. Accordingly, if the intermediate product is sent into the $NO_X$ purification catalyst 14, the hydrocarbons HC and the $NO_X$ in the bonded molecules immediately react, whereby the $NO_X$ is reduced to $N_2$. Hydrocarbons HC in excess for the $NO_X$ reduction react with oxygen and are eliminated. That is, the $NO_X$ is purified well in the $NO_X$ purification catalyst 14.

On the other hand, the $NO_X$ purification catalyst 14 stores $NO_X$ that had not been stored in the intermediate product producing catalyst 12 when the air fuel ratio of the exhaust gas is lean. The release of this $NO_X$ from the $NO_X$ purification catalyst 14 and the reduction action of the released $NO_X$ are promoted by the reaction heat of the intermediate products fed from the intermediate product producing catalyst 12.

Figure 3:
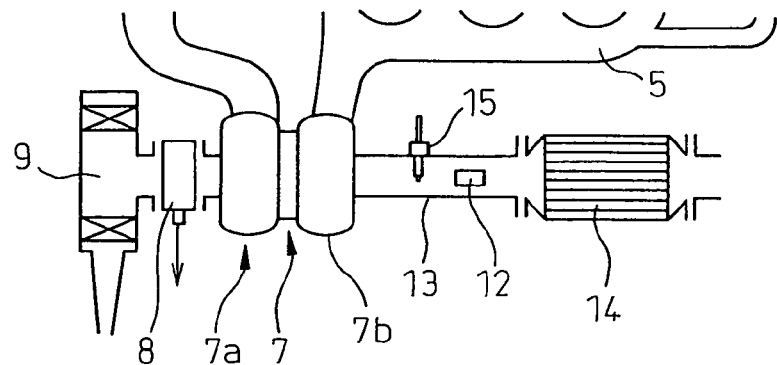
FIG. 3 is a view showing another embodiment of part of a compression ignition type internal combustion engine.

FIG. 3 shows another embodiment of the intermediate product producing catalyst 12. As shown in the embodiment shown in FIG. 3, the intermediate product producing catalyst 12 is arranged inside the engine exhaust passage upstream from the $NO_X$ purification catalyst 14, that is, in the exhaust pipe 13. As will be understood from FIG. 3, this intermediate product producing catalyst 12 comprises a compact catalyst having a volume smaller than the $NO_X$ purification catalyst 14 and through which a portion of the exhaust gas flowing into the $NO_X$ purification catalyst 14 flows. Inside the engine exhaust passage upstream of the compact catalyst 12, that is, the exhaust pipe 13, a fuel feed valve 15 for feeding fuel into the compact catalyst 12 is arranged.

Figure 4:
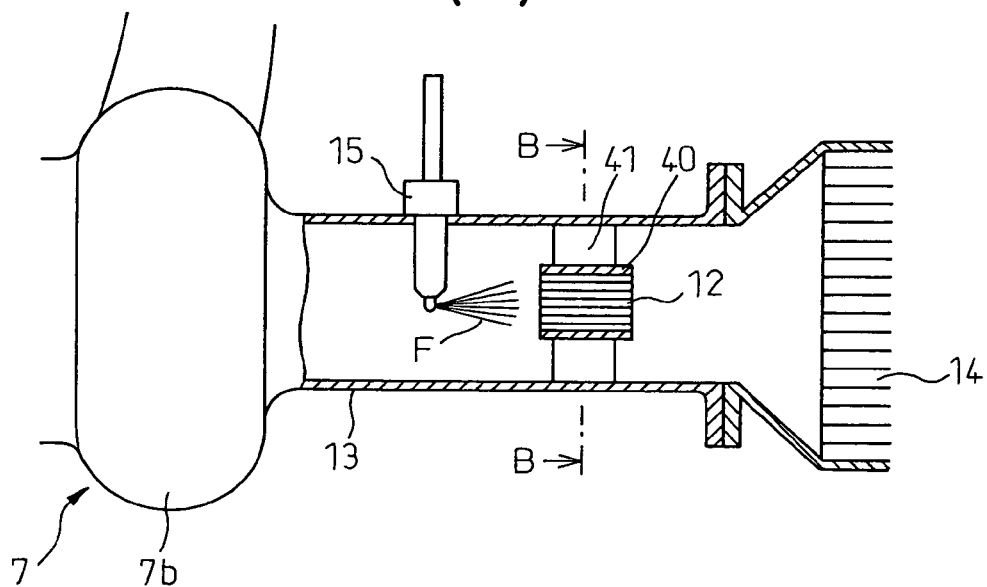
FIG. 4 is an enlarged view of surroundings of the compact catalyst of FIG. 1.
Figure 4:
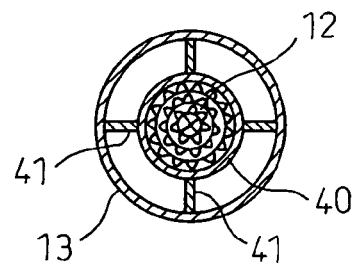

FIG. 4(A) shows an enlarged view of the surroundings of the compact catalyst 12 in FIG. 3, while FIG. 4(B) shows a cross-sectional view along the B-B line in FIG. 4(A). In the embodiment shown in FIGS. 4(A) and (B), the compact catalyst 12 has a substrate comprising a stacked structure of thin flat metal sheets and thin corrugated metal sheets. A layer of a catalyst carrier comprising, for example, alumina is formed on the surface of the substrate. The catalyst carrier, as shown in FIG. 2(A), carries the platinum 31 and the $NO_X$ absorbent 32 on it. That is, this compact catalyst 12 comprises the $NO_X$ storage catalyst.

As will be understood from FIGS. 4(A) and (B), this compact catalyst 12 has a smaller cross-section than the cross-section of the entire flow passage of the exhaust gas going to the $NO_X$ purification catalyst 14, that is, a smaller cross-section than the cross-section of the exhaust pipe 13, and forms a tube extending along the flow direction of the exhaust gas at the center of the exhaust pipe 13. Note that in the embodiment shown in FIGS. 4(A) and (B), the compact catalyst 12 is arranged inside a cylindrical outer frame 40. The cylindrical outer frame 40 is supported by a plurality of stays 41 in the exhaust pipe 13.

Note that, in the embodiment shown in FIG. 3 and FIGS. 4(A) and (B), the amount of feed of the mist fuel F is set so that when the mist fuel is fed from the fuel feed valve 15 into the compact catalyst, that is, the intermediate product producing catalyst 12 as shown by F of FIG. 4(A), an air fuel ratio of the exhaust gas in the intermediate product producing catalyst 12 becomes less than 5.

In this regard, the compact catalyst 12 has high flow passage resistance, therefore the amount of exhaust gas flowing into the compact catalyst 12 is small and, accordingly, the flow rate of the exhaust gas in the compact catalyst 12 becomes considerably slower than the flow rate of the exhaust gas flowing through the inside of the exhaust pipe 13. In this way, if the flow rate of the exhaust gas becomes slow, the release action of $NO_X$ from the compact catalyst 12 and the reaction of the released $NO_2$ and hydrocarbons HC are promoted, therefore the action of production of the intermediate product 33 comprising the bonded molecules of the hydrocarbons HC and $NO_X$ is promoted. This results in $NO_X$ being further purified well in the $NO_X$ purification catalyst 14.

Further, if the amount of feed of mist fuel F is set so that the air fuel ratio of the exhaust gas in the compact catalyst 12 becomes less than 5, that is, if the exhaust gas in the compact catalyst 12 is made higher in richness, the release action of $NO_X$ from the compact catalyst 12 and the reaction of the released $NO_2$ and hydrocarbons HC are further promoted and therefore the action of production of the intermediate product 33 comprising the bonded molecules of the hydrocarbons HC and $NO_X$ is promoted. This results in $NO_X$ being further purified extremely well in the $NO_X$ purification catalyst 14.

Figure 5:
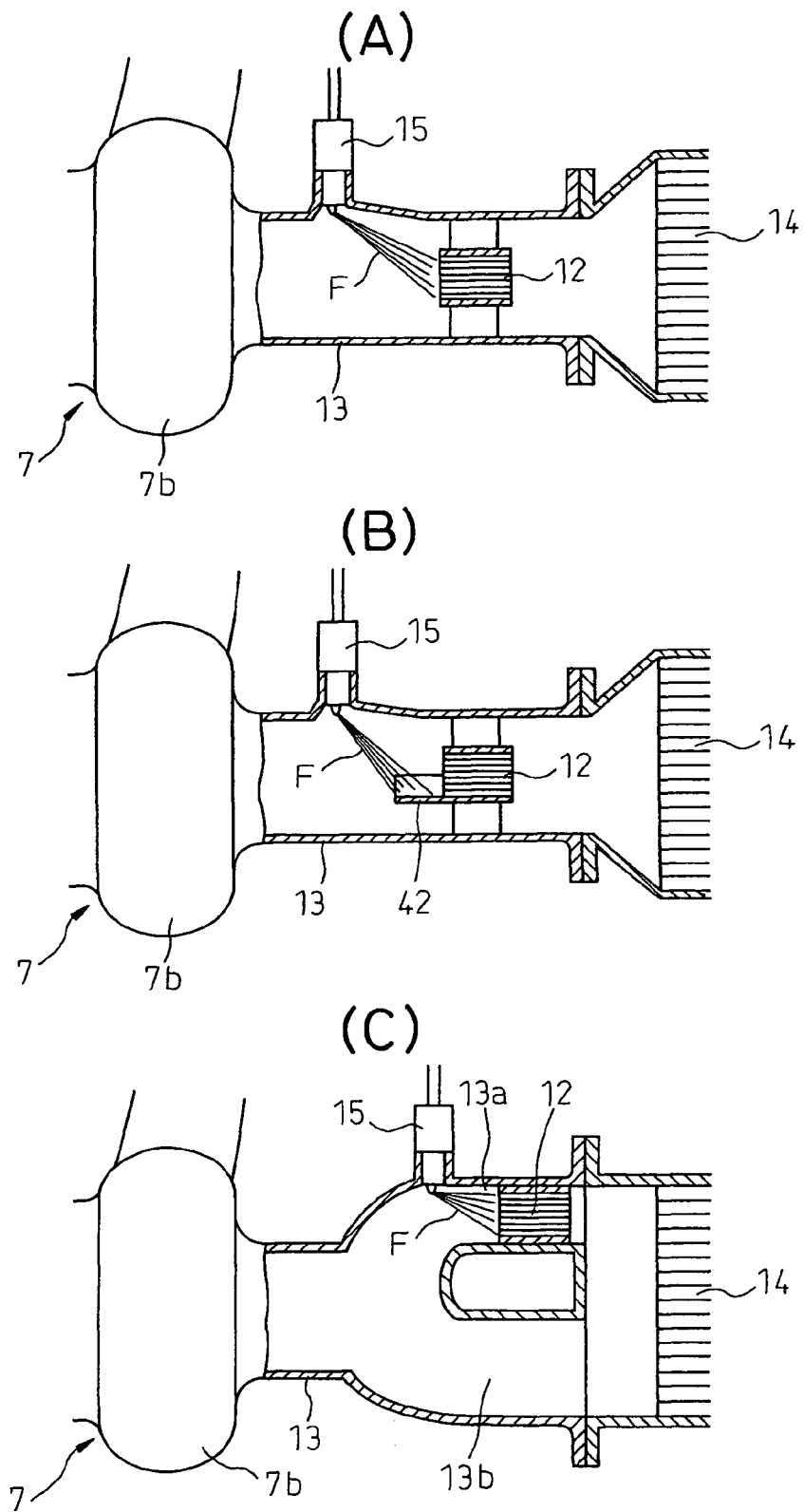
FIG. 5 is a view showing various modifications.

Next, referring to FIG. 5, various modifications of the arrangement of the fuel feed valve 15 or arrangement or shape of the compact catalyst 12 will be described sequentially.

First, if explaining from FIG. 5(A), in the modification shown in FIG. 5(A), to prevent direct exposure of the nozzle opening of the fuel feed valve 15 to the high temperature exhaust gas flow, the nozzle opening is arranged in a recess formed in the inner wall surface of the exhaust pipe 13.

Further, in the modification shown in FIG. 5(B), at the upstream side end face of the compact catalyst 12, a trough shaped fuel guide part 42 extending upstream from the periphery of the upstream side end face is formed. Fuel is injected from the fuel feed valve 15 toward the fuel guide part 42.

On the other hand, in the modification shown in FIG. 5(C), the flow passage of the exhaust gas in the exhaust pipe 13 going toward the $NO_X$ purification catalyst 14 is formed from a pair of divided flow passages 13a and 13b. The compact catalyst 12 is arranged in one of the flow passage 13a among the flow passages 13a and 13b. Fuel is injected from the fuel feed valve 15 toward the upstream side end face of the compact catalyst 12. In this modification as well, if seen from the $NO_X$ purification catalyst 14, the compact catalyst 12 is arranged at a partial region in the horizontal cross-section of the upstream side exhaust flow passage.

The invention claimed is:

1. A method of purifying exhaust from an internal combustion engine comprising:
    providing an $NO_x$ purification catalyst in an engine exhaust passage;
    providing an intermediate product producing catalyst in the engine exhaust passage upstream of the $NO_x$ purification catalyst, the intermediate product producing catalyst having a smaller cross-section than a cross-section of the engine exhaust passage around the intermediate product producing catalyst such that some exhaust can flow from upstream of the intermediate product producing catalyst to the $NO_x$ purification catalyst without passing through the intermediate product producing catalyst and the intermediate product producing catalyst being capable of producing intermediate products, wherein the intermediate products are bonded molecules of an $NO_x$ and hydrocarbon produced from the $NO_x$ stored in the intermediate product producing catalyst or the $NO_x$ contained in the exhaust gas and the hydrocarbon contained in a fed fuel,
    providing a fuel feed valve in the engine exhaust passage upstream of the intermediate product producing catalyst to feed a mist fuel from the fuel feed valve to the intermediate product producing catalyst,
    storing $NO_x$ in the intermediate product producing catalyst when an air-fuel ratio of the exhaust gas is lean,
    controlling release of the intermediate products from the intermediate product producing catalyst by feeding the mist fuel from the fuel feed valve to the intermediate product producing catalyst before the intermediate product catalyst becomes saturated with $NO_x$ to make the exhaust gas rich or have a stoichiometric air-fuel ratio,
    passing the intermediate products into the $NO_x$ purification catalyst, and
    purifying the intermediate products in the $NO_x$ purification catalyst.

2. The method of claim 1, further comprising storing NOx contained in the exhaust gas in the $NO_x$ purification catalyst when an air fuel ratio of an inflowing exhaust gas is lean and releasing the stored $NO_x$ when the air fuel ratio of the inflowing exhaust gas is a stoichiometric air fuel ratio or a rich air fuel ratio.

3. The method of claim 1, wherein the intermediate product producing catalyst comprises a compact catalyst having a volume smaller than the $NO_x$ purification catalyst and through which a portion of the exhaust gas flowing into the $NO_x$ purification catalyst flows.

4. The method of claim 3, wherein the compact catalyst has a tube form extending in a flow direction of the exhaust gas.

5. The method of claim 3, comprising feeding an amount of mist fuel from the fuel feed valve into the intermediate product producing catalyst, to generate an air fuel ratio of an exhaust gas in the intermediate product producing catalyst of less than 5.

6. The method of claim 1, wherein an amount of the hydrocarbon in the bonded molecules is greater than an amount of the hydrocarbon used to react with the $NO_x$ in the bonded molecules.

7. The method of claim 1, further comprising providing a nozzle connected to the fuel feed valve in a recess that is formed in an inner wall surface of the exhaust passage, and feeding a mist fuel from the nozzle of the fuel feed valve onto an upstream end face of the intermediate product producing catalyst.

8. The method of claim 7, wherein the portion of the exhaust passage extending from the nozzle of the fuel feed valve to the intermediate product producing catalyst is substantially straight.

9. The method of claim 1, further comprising controlling release of intermediate products from the intermediate product producing catalyst by feeding the mist fuel from the fuel feed valve to the intermediate product producing catalyst to make the exhaust gas rich or have a stoichiometric air-fuel ratio before the $NO_x$ purification catalyst becomes saturated with $NO_x$.

* * * * *